United States Patent [19]

Ikenaga et al.

[11] Patent Number: 4,626,371

[45] Date of Patent: Dec. 2, 1986

[54] MAGNETIC COMPOSITE

[75] Inventors: Yukio Ikenaga; Katsuhiko Takahashi, both of Fuji; Tsuneyoshi Okada, Kawasaki; Kenji Hijikata; Toshio Kanoe, both of Fuji, all of Japan

[73] Assignee: Celanese Corporation, New York, N.Y.

[21] Appl. No.: 773,683

[22] Filed: Sep. 9, 1985

[30] Foreign Application Priority Data

Sep. 12, 1984 [JP] Japan ............................. 59-191368

[51] Int. Cl.$^4$ ........................... H01F 1/00; H01F 1/26
[52] U.S. Cl. .............................. 252/62.54; 252/62.53; 252/62.51; 252/62.55
[58] Field of Search ............... 252/62.54, 62.53, 62.52, 252/62.51, 62.55

[56] References Cited

U.S. PATENT DOCUMENTS

| | | | |
|---|---|---|---|
| 3,070,841 | 1/1963 | Schornstheimer | 252/62.54 |
| 3,677,947 | 7/1972 | Ray et al. | 252/62.54 |
| 3,793,074 | 2/1974 | Frankenthal et al. | 252/62.54 |
| 4,022,701 | 5/1977 | Sawa et al. | 252/62.51 R |
| 4,025,694 | 5/1977 | Pletcher et al. | 252/62.54 |
| 4,282,296 | 8/1981 | Murphy et al. | 252/62.54 |
| 4,293,627 | 10/1981 | Murphy et al. | 252/62.54 |
| 4,451,535 | 5/1984 | Pingaud et al. | 252/62.54 |
| 4,504,542 | 3/1985 | Miyoshi et al. | 252/62.54 |
| 4,525,424 | 6/1985 | Bradshaw | 252/62.54 |

FOREIGN PATENT DOCUMENTS 0033423 8/1981 European Pat. Off. .

Primary Examiner—Arthur P. Demers
Attorney, Agent, or Firm—Burns, Doane, Swecker & Mathis

[57] ABSTRACT

A magnetic composite comprises a magnetic powder and a resin binder of a melt-processable polymer to form the anisotropic melt phase.

19 Claims, No Drawings

MAGNETIC COMPOSITE

The present invention relates to magnetic composite material compounds which are excellent in moldability, dimensional stability, mechanical properties, heat resistance, flame resistance, and magnetic properties.

PRIOR ART

Magnetic composite materials in which a resin and a magnetic material are compounded are presently used in various areas of application, such as transformers, motors, and switches, since they are superior to conventional sintered metallic magnets in mechanical properties, processability, and dimensional accuracy, and have more stable magnetic properties. Resins used in such composite materials include thermosetting resins such as epoxy resins and phenolics, and thermoplastic resins such as polypropylene, ethylene-vinyl acetate copolymer, nylon, PBT, and PPS. Generally, a maximal energy product increases in proportion to the quantity of a magnetic material added, and from the standpoint of moldability, the thermosetting type resins have an advantage over the thermoplastic type in that they permit a greater addition of a magnetic material, which means a greater maximum energy product obtained. In respect of mass producibility the thermoplastic type has an advantage. Generally, the two types of resins are selectively used according to the uses to which such composite material is directed and by taking into consideration the aforesaid differences and the working temperature limits for the resins.

PROBLEM TO BE SOLVED BY THE INVENTION

With the conventional resins of thermoplastic type largely used hitherto, however, the difficulty is that various different additives must be added to the base resin for the purpose of moldability improvement. Where a large amount of magnetic material (about 95% by weight) is to be contained in such composite material, it is impracticable to obtain any satisfactory moldability unless various kinds of additives are added. As such, the resulting magnetic composite material leaves much to be desired in respect of dimensional stability, mechanical properties, heat resistance, flame resistance, and magnetic properties.

The present invention has as its object the provision of a magnetic composite material compound having definite advantages over conventional magnetic composite materials using aforesaid thermoplastic resins as binders, in moldability, dimensional stability, mechanical properties, heat resistance, flame resistance, and magnetic properties.

MEANS FOR SOLVING THE PROBLEM

The present inventors found that if a melt-processable polymer compound which can form an anisotropic melt phase, as a binder resin, is blended with a magnetic powder material, the polymer compound provides an exceedingly low melt viscosity when the blend is melted, because the compound has its polymer chains highly oriented even in its state of being left unsubjected to any external stress such as drawing, or in its static state, and that the polymer compound permits a large quantity of magnetic material to be contained in the blend without addition of various different additives which, in the case of conventional magnetic composite materials of thermoplastic type, have to be added for the purpose of moldability improvement, so that the blend is readily moldable through various molding techniques such as injection molding, extrusion molding, and compression molding. Furthermore, it was found that the magnetic composite material thus obtained has excellent performance characteristics in respect of dimensional stability, mechanical properties, heat resistance, flame resistance, and so forth. Hence, the present invention.

That is, the invention provides a magnetic composite material compound comprising a blend of a magnetic powder material with a binder resin composed of a melt-processable polymer compound which can form an anisotropic melt phase. Where the binder resin according to the invention is used, a magnetic composite material compound containing a large amount of magnetic powder material within the range of 1–95% by weight relative to the total of the magnetic powder material and binder resin contents can easily be molded, through melting, into a desired product having excellent characteristics. A preferred binder-resin content of the composite material compound is 5–50% by weight, or more specifically, 7–20% by weight.

The binder resin in accordance with the invention is a thermoplastic and melt-processable polymer compound which may be generally classified as a thermotropic liquid crystalline polymer.

A polymer capable of forming such anisotropic melt phase is by nature such that at its molten state the polymer's molecular chains assume orderly parallel orientations. The state of such molecular orientations is often called a liquid crystalline state or nematic phase of a liquid crystalline material. Such polymer is produced from monomers each having a plurality of extended chain bonds which are generally elongate, flat, and considerably rigidly structured along the axes of the molecular extensions and which are usually in either coaxial or parallel relation.

The nature of an anisotropic melt phase can be determined by conventional polarization tests using crossed polarizers. More specifically, such phase can be determined by employing a Leitz polarization microscope and by observing a specimen placed on a Leitz hot stage in a nitrogen atmosphere and at 40 magnifications. The aforesaid polymer is optically anisotropic. That is, it transmits light rays when it is subjected to inspection between the crossed polarizers. Wherever the specimen is optically anisotropic, it transmits polarized light even if it is in a static state.

Possible components of a polymer which can form an anisotropic melt phase as aforesaid may be enumerated as follows:

(1) a component consisting of one or more kinds of aromatic dicarboxylic or alicyclic dicarboxylic acids;

(2) a component consisting of one or more kinds of aromatic, alicyclic or aliphatic diols;

(3) a component consisting of one or more kinds of aromatic hydroxy-carboxylic acids;

(4) a component consisting of one or more kinds of aromatic thio-carboxylic acids;

(5) a component consisting of one or more kinds of aromatic dithiols or aromatic thiophenols; and (6) a component consisting of one or more kinds of aromatic hydroxylamines or aromatic diamines.

Thus, anisotropic melt-phase forming polymers may comprise one of the following combinations:

(I) a polyester consisting of components (1) and (2) above;
(II) a polyester consisting of component (3) only;
(III) a polyester consisting of components (1), (2) and (3);
(IV) a polythiol ester consisting of component (4) only;
(V) a polythiol ester consisting of components (1) and (5);
(VI) a polythiol ester consisting of components (1), (4) and (5);
(VII) a polyester amide consisting of components (1), (3) and (6); and
(VIII) a polyester amide consisting of components (1), (2), (3) and (6).

Though not included in the above enumerated combinations of components, aromatic polyazomethyls are among other anisotropic melt-phase forming polymers. They include, for example, poly(nitrilo-2-methyl-1,4-phenylenenitriloethylidene-1,4-phenylene ethylidene); poly(nitrilo-2-methyl-1,4-phenylenenitrilomethylidene-1,4-phenylene methylidene); and poly(nitrilo-2-chloro-1,4-phenylenenitrilomethylidene-1,4-phenylenemethylidene).

Further, among polymers not included in the above enumerated combinations of components but which can form an anisotropic melt phase are varieties of polyester carbonate, such as those which are essentially of 4-oxybenzoyl units, dioxybenzoyl units, dioxycarbonyl units, and terephthaloyl units.

Enumerated below are compounds which may be components of aforesaid items (I)–(VIII).

Among aromatic dicarboxylic acids are terephthalic acid, 4,4'-diphenyl dicarboxylic acid, 4,4'-triphenyl dicarboxylic acid, 2,6-naphthalene dicarboxylic acid, diphenyl ether-4,4'-dicarboxylic acid, diphenoxyethane-4,4'-dicarboxylic acid, diphenoxybutane-4,4'-dicarboxylic acid, isophthalic acid, diphenylether-3,3'-dicarboxylic acid, diphenoxyethane-3,3'-dicarboxylic acid, diphenylethane-3,3'-dicarboxylic acid, and naphthalene-1,6-dicarboxylic acid; or alkyl-, alkoxy- or halogen-substituted aromatic dicarboxylic acids, such as chloroterephthalic acid, dichloroterephthalic acid, bromoterephthalic acid, methylterephthalic acid, dimethylterephthalic acid, ethylterephthalic acid, methoxyterephthalic acid, and ethoxyterephthalic acid.

Among alicyclic dicarboxylic acids available are the following: trans-1,4-cychlohexane-dicarboxylic acid, cis-1,4-cyclohexanedicarboxylic acid; or alkyl-, alkoxy- or halogen-substituted alicyclic dicarboxylic acids, such as trans-1,4-(1-methyl)cyclohexanedicarboxylic acid and trans-1,4-(1-chlor)cyclohexanedicarboxylic acid.

Among aromatic diols available are the following: hydroquinone, resorcinol, 4,4'-dihyroxydiphenyl, 4,4'-dihydroxytriphenyl, 2,6-naphthalenediol, 4,4'-dihydroxydiphenyl ether, bis(4-hydroxyphenoxy)ethane, 3,3'-dihydroxydiphenyl, 3,3'-dihydroxydiphenyl ether, 1,6-naphthalenediol, 2,2-bis(4-hydroxyphenyl)propane, and 2,2-bis(4-hydroxyphenyl)methane; or alkyl-, alkoxy- or halogen-substituted aromatic diols, such as chlorohydroquinone, methyl hydroquinone, 1-butylhydroquinone, phenyl hydroquinone, methoxyhydroquinone, phenoxyhydroquinone, 4-chlororesorcinol, and 4-methylresorcinol.

Among alicyclic diols available are the following: trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, and trans-1,3-cyclohexanedimethanol; or alkyl-, alkoxy- or halogen-substituted alicyclic diols, such as trans-1,4-(1-methyl)cyclohexanediol, and trans-1,4-(1-chlor)cyclohexanediol.

Among aliphatic diols available are straight-chain or branched diols such as ethylene glycol, 1,3-propanediol, 1,4-butanediol, and neopentyl glycol.

Among aromatic hydroxy-carboxylic acids available are the following: 4-hydroxybenzoic acid, 3-hydroxybenzoic acid, 6-hydroxy-2-naphthoic acid, and 6-hydroxy-1-naphthoic acid; or alkyl-, alkoxy- or halogen-substituted aromatic hydroxy-carboxylic acids, such as 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6-hydroxy-5-methyl-2-naphthoic acid, 6-hydroxy-5-methoxy-2-naphthoic acid, 3-chloro-4-hydroxybenzoic acid, 2-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, and 6-hydroxy-5,7-dichloro-2-naphthoic acid.

Among mercaptocarboxylic acids available are 4-mercaptobenzoic acid, 3-mercaptobenzoic acid, 6-mercapto-2-naphthoic acid, and 7-mercapto-2-naphthoic acid.

Among aromatic dithiols available are benzene-1,4-dithiol, benzene-1,3-dithiol, 2,6-naphthalenedithiol, and 2,7-naphthalene-dithiol.

Among mercaptophenols available are 4-mercaptophenol, 3-mercaptophenol, 6-mercaptophenol, and 7-mercaptophenol.

For aromatic hydroxylamines and aromatic diamines the following may be listed: 4-aminophenol, N-methyl-4-aminophenol, 1,4-phenylenediamine, N-methyl-1,4-phenylenediamine, N,N'-dimethyl-1,4-phenylenediamine, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenyl methane, 4-amino-4'-hydroxydiphenyl sulfide, 4,4'-diaminophenylsulfide(thiodianiline), 4,4'-diaminodiphenyl sulfone, 2,5-diaminotoluene, 4,4'-ethylenedianiline, 4,4'-diaminodiphenoxy ethane, 4,4'-diaminodiphenyl methane(methylenedianiline), and 4,4'-diaminodiphenyl ether(oxydianiline).

With aforesaid polymers (I)–(VIII) which may individually consist of some of these components, it is to be noted that depending upon their components, ratios thereof, and sequence distribution of the components, some polymers may not form an anisotropic melt phase, whereas some others will form such phase. Needless to say, polymers used for the purpose of the invention are limited to those of above enumerated polymers which will form an anisotropic melt phase.

Polyesters in items (I), (II) and (III) above and polyesteramides in (VIII) above, or anisotropic melt-phase forming polymers suitable for the purpose of the invention, may be produced by various esterification techniques wherein organic monomer compounds having functional groups capable of forming required repeating units by condensation are allowed to react with one another. For example, functional groups of such organic monomer compounds may be carboxyl, hydroxyl, ester, acyloxy, acid halide, or amine groups. Said organic monomer compounds can be caused to react with one another by melt acidolysis and without the presence of heat exchange fluid. This method is such that the monomers are first heated together to form a melt of reaction materials. As the reaction progresses, solid polymer particles become suspended in the melt. Vacuum may be applied in order to facilitate the removal of volatiles (e.g. acetic acid or water) produced at the final stage. Slurry polymerization techniques may also be employed in producing a complete aromatic polyester suited to the purpose of the invention. Where this method is employed, solid particles are obtained as suspended in the heat exchange medium.

Whichever of the aforesaid methods, acidolysis or slurry polymerization, may be employed, organic monomer reactants for deriving a complete aromatic polyester may be subjected to reaction in a modified form in which the hydroxyl groups of such monomers at ordinary temperatures are esterified (that is, in the form of a lower acyl ester). The lower acyl groups are preferably such that each has about 2–4 carbon atoms. Preferably, acetic ester of such organic monomer reactants is subjected to reaction.

Typical examples of catalysts arbitrarily available for either acidolysis or slurry polymerization are dialkyl tin oxide (e.g. dibutyl tin oxide), diallyl tin oxide, titanium dioxide, antimony trioxide, alkoxy titanium silicate, titanium alkoxide, alkali and alkali earth metal salt of carboxylic acid (e.g. zinc acetate), Lewis acid (e.g. BF$_3$), halogenated hydrogen (e.g. HCl), and the like gaseous acid catalysts. The usage of such catalyst is generally about 0.001–1 wt % on the basis of total monomer weight, and more specifically it is 0.01–0.2 wt %.

Complete aromatic polymers suitable for the purpose of the invention have a tendency of being substantially insoluble in ordinary solvents and are therefore unsuitable for solution processing purposes. As already mentioned, however, these polymers can easily be processed by ordinary melt processing techniques. Certain specifically preferred complete aromatic polymers are somewhat soluble in pentafluorophenol.

Complete aromatic polyesters suitable for the purpose of the invention generally have a weight-average molecular weight of approximately 2,000–200,000, or preferably approximately 10,000–50,000, or more preferably approximately 24,000–25,000. Whilst, preferred complete aromatic polyester amides generally have a molecular weight of about 5,000–50,000, or preferably about 10,000–30,000, e.g. 15,000–17,000. Such molecular weight can be determined by gel permeation chromatography or any other standard method of measurement which does not involve solution forming of the polymer, for example, through end group analysis of compression molded films by infrared spectrophotometry. It is also possible to determine such molecular weight by a light-scattering method with respect to a pentafluorophenol solution of polymer.

The aforesaid complete aromatic polyesters and polyester amides generally exhibit a inherent viscosity number (I.V.) of at least about 2.0 dl/g, e.g. about 2.0–10.0 dl/g, when it is dissolved in pentafluorophenol at 60° C. and at 0.1 wt % concentration.

Anisotropic melt-phase forming polyesters particularly preferred for use for the purpose of the invention contain naphthalene-part repeating units, such as 6-oxy-2-naphthoyl, 2,6-dioxynaphthalene, 2,6-dihydroxynaphthalene, and 2,6-dicarboxynaphthalene, in quantities of about 10 mol % or more. Preferred polyester amides contain repeating units of such naphthalene parts and 4-aminophenol or 1,4-phenylenediamine parts. More specifically, they are as follows:

(1) A polyester composed of the following repeating units I and II:

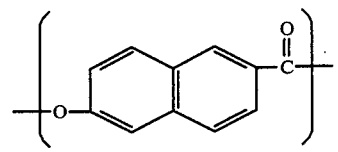

I

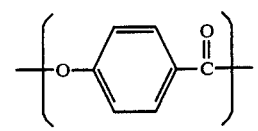

II

This polyester contains about 10–90 mol % of unit I and about 10–90 mol % of unit II. In one form thereof, unit I is present to the order of about 65–85 mol %, or preferably about 70–80 mol % (for example, about 75 mol %). In another form, unit II is present at a far much lower molal concentration, say, about 15–35 mol %, or preferably about 20–30 mol %. At least some of the hydrogen atoms in bond to a ring may, in some cases, be substituted by a substituent selected from the group consisting of alkyl groups having 1–4 carbon atoms, alkoxy groups having 1–4 carbon atoms, halogens, phenyl, substituted phenyl, and combinations of them.

(2) A polyester composed essentially of the following repeating units I, II and III:

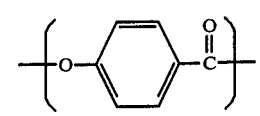

I

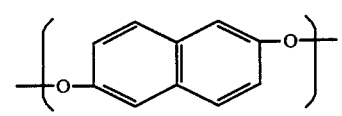

II

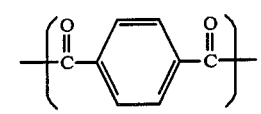

III

This polyester contains about 30–70 mol % of unit I. Preferably, the polyester contains about 40–60 mol % of unit I, about 20–30 mol % of unit II, and about 20–30% of unit III. In some cases, at least some of the hydrogen atoms in bond to a ring may be substituted by a substituent selected from the group consisting of alkyl groups having 1–4 carbon atoms, alkoxy groups having 1–4 carbon atoms, halogens, phenyl, substituted phenyl, and combinations of them.

(3) A polyester composed essentially of the following repeating units I, II, III and IV.

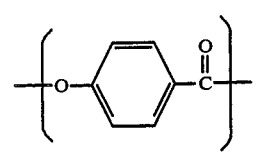

I

-continued

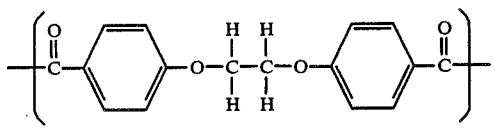

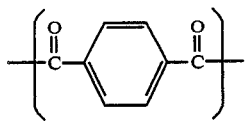

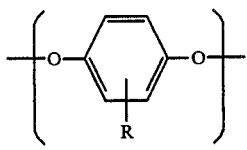

(where, R represents methyl, chloro, bromo, or a combination thereof, that is, a substituent group relative to a hydrogen atom on an aromatic ring). This polyester contains about 20-60 mol % of unit I, about 5-18 mol % of unit II, about 5-35 mol % of unit III, and about 20-40 mol % of unit IV. Preferably, the polyester has about 35-45 mol % of unit I, about 10-15 mol % of unit II, about 15-25 mol % of unit III, and about 25-35 mol % of unit IV. It is to be noted, however, that the total molar concentration of units II and III is substantially equal to the molar concentration of unit IV. In some cases, at least a part of the number of hydrogen atoms in bond to a ring may be substituted by a substituent selected from the group consisting of alkyl groups having 1-4 carbon atoms, alkoxy groups having 1-4 carbon atoms, halogens, phenyl, substituted phenyl, and combinations of them.

This complete aromatic polyester generally exhibits a inherent viscosity number of at least 2.0 dl/g, or for example 2.0-10.0 dl/g, when it is dissolved in pentafluorophenol at 60° C. and at 0.3 w/v % concentration.

(4) A polyester composed essentially of the following repeating units I, II, II and IV:

(I)

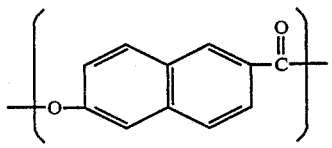

(II)

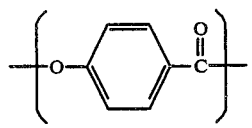

(III) A dioxyaryl unit expressed by general formula —O—Ar—O— (where, Ar represents a bivalent group including at least one aromatic ring).

(IV) A dicarboxyaryl unit expressed by general formula

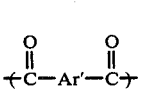

(where, Ar' represents a bivalent group including at least one aromatic ring).

This polyester contains about 20-40 mol % of unit I, more than 10 mol % but less than about 50 mol % of unit II, more than 5 mol % but less than about 30 mol % of unit III, and more than 5 mol % but less than about 30 mol % of unit IV. Preferably, the polyester contains about 20-30 mol % (e.g. about 25 mol %) of unit I, about 25-40 mol % (e.g. 35 mol %) of unit II, about 15-25 mol % (e.g. about 20 mol %) of unit III, and about 15-25 mol % (e.g. about 20 mol %) of unit IV. In some cases, at least a part of the number of hydrogen atoms in bond to a ring may be substituted by a substituent selected from the group consisting of alkyl groups having 1-4 carbon atoms, alkoxy groups having 1-4 carbon atoms, halogens, phenyl, and combinations of them.

Units III and IV are preferably symmetrical in the sense that bivalent bonds connecting the units to other units on both sides thereof within a polymeric main chain are symmetrically arranged on one or more aromatic rings (for example, parapositioned relative to each other when they are present on a naphthalene ring, or arranged on diagonally located rings). It is noted, however, that such asymmetric units as may be derived from resorcinol or isophthalic acid may possibly be used.

A preferred dioxyaryl unit III is:

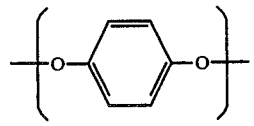

and a preferred dicarboxyaryl unit is:

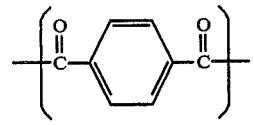

(5) A polyester composed essentially of the following repeating units I, II, and III:

(I)

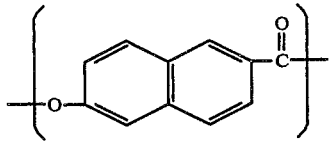

(II) A dioxyaryl unit expressed by general formula —O—Ar—O— (where, Ar represents a bivalent group having at least one aromatic ring).

(III) A carboxyaryl unit expressed by general formula

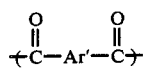

(where, Ar' is a bivalent group having at least one aromatic ring).

This polyester contains about 10-90 mol % of unit I, about 5-45 mol % of unit II, and 5-45 mol % unit III. Preferably, the polyester contains about 20-80 mol % of unit I, about 10-40 mol % of unit II, and about 10-40 mol % of unit III. More preferably, the polyester contains about 60-80 mol % of unit I, about 10-20 mol % of unit II, and about 10-20 mol % of unit III. Further, in some cases, at least some of hydrogen atoms in bond to a ring may be substituted by a substituent selected from the group consisting of alkyls having 1-4 carbon atoms, alkoxy groups having 1-4 carbon atoms, halogens, phenyl, substituted phenyl, and combinations of them.

A preferred dioxyaryl unit II is:

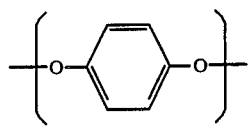

and a preferred dicarboxyaryl unit is:

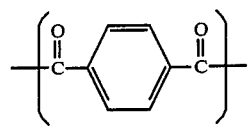

(6) A polyester composed essentially of the following repeating units I, II, III and IV:

(I)

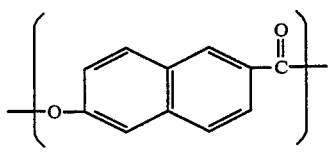

(II) General formula

(where, A represents a divalent group or bivalent trans-cyclohexane group having at least one aromatic ring).

(III) General formula —Y—Ar—Z— (where, Ar represents a bivalent group having at least one aromatic group; Y denotes O, NH or NR; Z denotes NH or NR; and R is an alkyl group or aryl group having 1-6 carbon atoms).

(IV) General formula —O—Ar'—O— (where, Ar' represents a bivalent group having at least one aromatic ring).

This polyester contains about 10-90 mol % of unit I, about 5-45 mol % of unit II, and about 5-45 mol % of unit III, and about 0-40 mol % of unit IV. Further, in some cases, at least some of hydrogen atoms in bond to a ring may be substituted by a substituent selected from the group consisting of alkyl groups having 1-4 carbon atoms, alkoxy groups having 1-4 carbon atoms, halogens, phenyl, substituted phenyl, and combinations of them.

A preferred carboxyaryl unit II is:

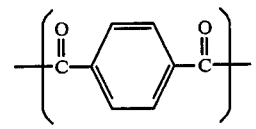

and a preferred unit III is:

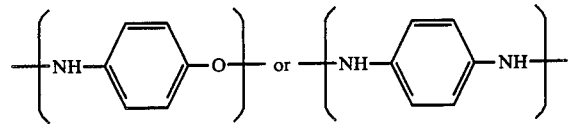

A preferred dioxyaryl unit IV is:

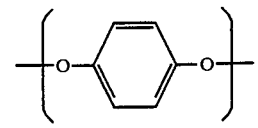

Further, in the scope of anisotropic melt-phase forming polymers in accordance with the invention there are included polymers such that a part of one polymeric chain consists of a segment or segments of any of the aforementioned anisotropic melt-phase forming polymers and the remaining part consists of a segment or segments of a thermoplastic resin which will not form any anisotropic melt phase.

Any melt-processable, anisotropic melt-phase forming polymer compound used for the purpose of the invention may contain one or more of (1) other anisotropic melt-phase forming polymer, (2) non-anisotropic melt-phase forming thermoplastic resin, (3) thermosetting resin, (4) low-molecular organic compound, and (5) inorganic material. It is noted here that an anisotropic melt-phase forming polymer contained in such compound and the remaining part thereof may be thermodynamically compatible or otherwise.

Included in the scope of abovesaid item (2) thermoplastic resin are, for example, polyethylene, polypropylene, polybutylene, polybutadiene, polyisoprene, polyvinyl acetate, polyvinyl chloride, polyvinylidene chloride, polystyrene, acrylic resins, ABS resins, AS resins, BS resins, polyurethane, silicone resins, fluoroplastics, polyacetal, polycarbonate, polyethylene terephthalate, polybutylene terephthalate, aromatic polyester, polyamide, polyacrylonitrile, polyvinyl alcohol, polyvinyl ether, polyether imide, polyamide imide, polyether etherimide, polyether ether ketone, polyether sulfone, polysulfone, polyphenylene sulfide, polyphenylene oxide, and so forth.

Included in the scope of aforesaid item (3) thermosetting resin are, for example, phenolic resins, epoxy resins, melamine resins, urea resins, unsaturated polyester resins, alkyd resins, and so forth.

Included in the scope of aforesaid item (4) low-molecular organic compound are, for example, various different materials used as additives for conventional thermoplastic and thermosetting resins, and more specifically plasticizers, stabilizers such as antioxidants and ultraviolet absorbing agents, antistatic agents, flame retardants, colorants such as dyes and pigments, foaming agents, divinyl-based compounds, crosslinking agents such as peroxides and vulcanizing agents, and lubricants used for fluidity and releasability improvement.

Included in the scope of aforesaid item (5) inorganic material are, for example, those inorganic materials which are generally added to thermoplastic and thermosetting resins, and more specifically inorganic fibers, such as glass fibers, carbon fibers, metallic fibers, ceramic fibers, boron fibers, and asbestos fibers, calcium carbonate, high-dispersion grade silicic acid, alumina, aluminum hydroxide, talc powder, mica, glass flake, glass beads, silica flour, quartz sand, all kinds of metal powders, carbon black, barium sulfate, calcined gypsum, other powder materials, silicon carbide, alumina, boron nitride, silicon nitride, and the like inorganic compounds, also whiskers and metallic whiskers.

For the purpose of the invention can be used various magnetic powder materials conventionally used in magnetic compound materials. Among hard-type magnetic powder materials available for use are, for example, hard ferrites, such as strontium ferrite; rare earth cobalt and alnico. Among soft-type magnetic powder materials available are, for example, soft ferrites consisting of metal oxides of Fe and Mn, Co, Ni, Cu, Zn, Mg and so forth; carbonyl iron powder and permalloy powder.

Average particle diameter of magnetic powder materials is generally 0.5–2.0 $\mu$m in the case of hard ferrite powder; 1–100 $\mu$m with rare earth cobalt powder, and 2–100 $\mu$m in the case of soft ferrite powder and carbonyl powder.

It is understood, however, that the average particle diameter of magnetic powder used for the purpose of the invention is not limited to above-mentioned ranges.

For molding of the magnetic composite material compound according to the invention, molding techniques for conventional composite materials may be employed. Conventionally, where the binder resin is of thermosetting type or of thermoplastic type, compression molding techniques or injection molding techniques are employed respectively. If magnetized after molding, the product will be magnetically isotropic. In order to provide the product with magnetic properties in which anisotropic magnetism is predominant, therefore, magnetic-field molding techniques are employed in which the product is magnetized concurrently when it is molded by employing a molding machine equipped with electromagnets for generating magnetic fields in or outside the mold. In such techniques, the mold comprises a combination of a non-magnetic material which does not transmit magnetism and a conventional magnetic material so that magnetic fields are guided in predetermined directions in the mold. Generally, a magnetic field of more than 10,000 Oe is required of the mold cavity.

EXAMPLES

To further illustrate the magnetic composite material compound of the invention, the following examples are given; however, these examples are not to be construed to limit the scope of the invention.

EXAMPLE 1

Eighty percent by weight of a strontium ferrite powder material having an average particle diameter of 1.2 $\mu$m was blended with 20% by weight of a binder resin consisting of polymer A capable of forming an anisotropic melt phase, said polymer A to be further described hereinafter, and the blend was subsequently melt extruded at 300° C. into a chip. Under the conditions of cylinder temperature 300° C., mold temperature 70° C., injection pressure 800 kg/cm$^2$, and applied magnetic field 12000 Oe, the chip was injection-molded in the magnetic field into a disk-shaped test piece of 20 mm dia$\times$5 mm thick. Measurement was made of the magnetic properties of the test piece. Under similar molding conditions, but with no magnetic field applied, two test pieces were prepared which respectively had dimensions of 63.6 mm long$\times$6.35 mm wide$\times$12.80 mm thick and 130 mm long$\times$13 mm wide$\times$6.4 mm thick. These test pieces were tested for Izod impact strength and heat distortion temperature.

EXAMPLES 2–4

Experiments were made in same manner as in Example 1, except that proportions of strontium ferrite powder were changed to 85 wt %, 90 wt %, and 95 wt % respectively.

EXAMPLES 5–7

Experiments were made in same manner as in Example 1, except that anisotropic melt-phase forming polymers B, C and D, which will be described hereinafter, were used as binder resins, instead of polymer A.

EXAMPLES 8 and 9

Experiments were made in same manner as in Example 1, except that rare earth cobalt Sm$_2$ (Co, Cu, Fe, Zr)$_{17}$ in powder form with an average particle diameter of 4 $\mu$m and Mn-Zn ferrite powder having an average particle diameter of 3.2 $\mu$m were used respectively as magnetic powder materials.

REFERENCE EXAMPLE 1

Experiments were made in same manner as in Example 1, except that 6-nylon was used as a binder resin, with cylinder temperature 280° C., mold temperature 100° C. and injection pressure 1000 kg/cm$^2$.

REFERENCE EXAMPLE 2

Experiments were made in same manner as in Example 1, except that a blend polymer of PPS/polyarylate+polyamide (7/3) was used as a binder resin, with cylinder temperature 350° C., mold temperature 40° C., and injection pressure 800 kg/cm$^2$.

Findings of these Examples and Reference Examples are summarized in Table 1.

Anisotropic melt-phase forming polymers A, B, C and D used as binder resins in the Examples were of the following compositions respectively.

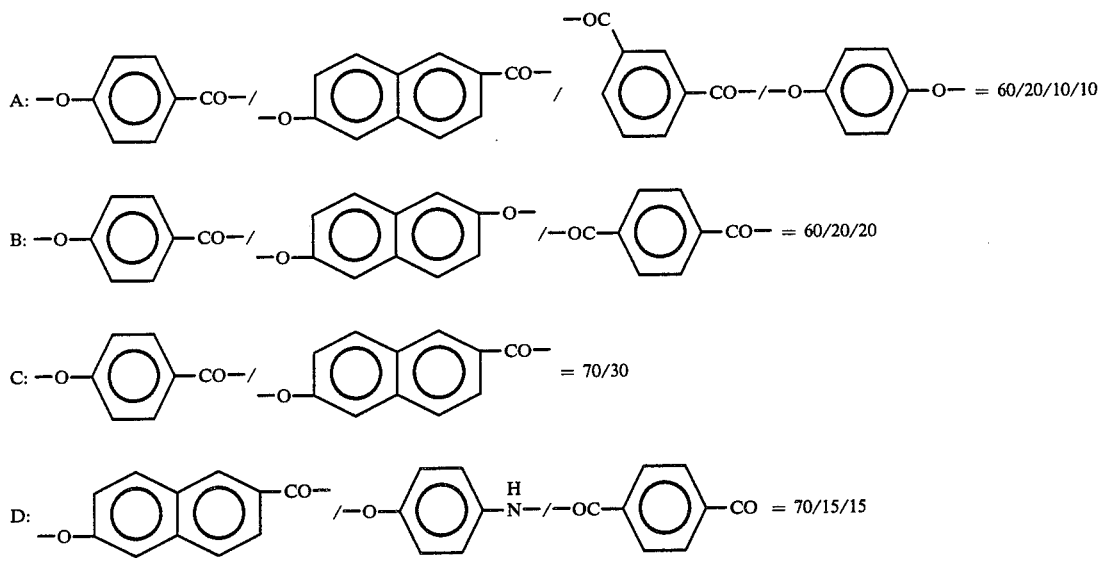

Now aforesaid resins A, B, C and D were produced are described in detail below.

RESIN A

Into a reactor equipped with an agitator, a nitrogen supply pipe, and a distillation pipe were charged 1081 parts by weight of 4-acetoxybenzoic acid, 460 parts by weight of 6-acetoxy-2-naphthoic acid, 166 parts by weight of isophthalic acid, and 194 parts by weight of 1,4-diacetoxybenzene, and the mixture was heated to 260° C. in a stream of nitrogen. While acetic acid was distilled off the reactor, the content of the reactor was vigorously stirred for 2.5 hours at 260° C., and then for 3 hours at 280° C. The temperature was further increased to 320° C., and after nitrogen supply was stopped, the reactor was subjected to gradual pressure reduction so that the pressure was lowered to 0.1 mmHg in 15 min. Stirring was then carried out for one hour under such temperature and pressure conditions.

The polymer thus obtained had an inherent viscosity of 5.0 as measured in pentafluorophenol at 0.1 wt % concentration at 60° C.

RESIN B

Into a reactor equipped with an agitator, a nitrogen supply pipe, and a distillation pipe were charged 1081 parts by weight of acetoxybenzoic acid, 489 parts by weight of 2,6-diacetoxynaphthalene, and 332 parts by weight of terephthalic acid, and the mixture was heated to 250° C. in a stream of nitrogen. While acetic acid was distilled off the reactor, the content of the reactor was vigorously stirred for 2 hours at 250° C., and then for 2.5 hours at 280° C. The temperature was further raised to 320° C., and after nitrogen supply was stopped, the reactor was subjected to gradual pressure reduction so that the pressure was lowered to 0.2 mmHg in 30 min. Stirring was carried out for 1.5 hours under such temperature and pressure conditions.

The polymer thus obtained had an inherent viscosity of 2.5 as measured in pentafluorophenol at 0.1 wt % concentration at 60° C.

RESIN C

Into a reactor equipped with an agitator, a nitrogen supply pipe, and a distillation pipe were charged 1261 parts by weight of 4-acetoxybenzoic acid, and 691 parts by weight of 6-acetoxy-2-naphthoic acid, and the mixture was heated to 250° C. in a stream of nitrogen. While acetic acid was distilled off the reactor, the content of the reactor was vigorously stirred for 3 hours at 250° C., and then for 2 hours at 280° C. The temperature was further raised to 320° C., and after nitrogen supply was stopped, the reactor was subjected to gradual pressure reduction so that the pressure was lowered to 0.1 mmHg in 20 min. Stirring was carried out for one hour under such temperature and pressure conditions.

The polymer thus obtained had an inherent viscosity of 5.4 as measured in pentafluorophenol at 0.1 wt % concentration at 60° C.

RESIN D

Into a reactor equipped with an agitator, a nitrogen supply pipe, and a distillation pipe were charged 1612 parts by weight of 6-acetoxy-2-naphthoic acid, 290 parts by weight of 4-acetoxy-acetoanilide, 249 parts by weight of terephthalic acid, and 0.4 part by weight of sodium acetate, and the mixture was heated to 250° C. in a stream of nitrogen. While acetic acid was distilled off the reactor, the content of the reactor was vigorously stirred for one hour at 250° C., and then for 3 hours at 300° C. The temperature was further raised to 340° C., and after nitrogen supply was stopped, the reactor was subjected to gradual pressure reduction so that the pressure was lowered to 0.2 mmHg in 30 min. Stirring was carried out for 30 min under such temperature and pressure conditions.

The polymer thus obtained had an inherent viscosity of 3.9 as measured in pentafluorophenol at 0.1 wt % concentration at 60° C.

TABLE 1

| | Composition | | Mech. Property | | Magnetic Property | | | |
|---|---|---|---|---|---|---|---|---|
| | Magnetic Powder (wt %) | Binder Resin (wt %) | Impact Str. (kg · cm/cm) | Heat Distortion Temp (°C.) | Resid Mag Flux Density (G) | Coercivity (Oe) | Max Energy Prod (MG · Oe) | Max Permb |
| Example | | | | | | | | |
| 1 | Sr Ferrite (80) | A (20) | 4.2 | 230° C. | 2290 | 2240 | 1.36 | — |
| 2 | Sr Ferrite (85) | A (15) | 3.9 | 230° C. | 2360 | 2310 | 1.41 | — |
| 3 | Sr Ferrite (90) | A (10) | 3.5 | 230° C. | 2410 | 2320 | 1.43 | — |
| 4 | Sr Ferrite (95) | A (5) | 3.6 | 230° C. | 2730 | 2690 | 1.60 | — |
| 5 | Sr Ferrite (90) | B (10) | 3.8 | 230° C. | 2650 | 2570 | 1.58 | — |
| 6 | Sr Ferrite (90) | C (10) | 3.7 | 230° C. | 2590 | 2610 | 1.56 | — |
| 7 | Sr Ferrite (90) | D (10) | 4.0 | 230° C. | 2630 | 2560 | 1.56 | — |
| 8 | Rare Earth Cobalt (90) | A (10) | 3.4 | 230° C. | 6680 | 6210 | 9.80 | — |
| 9 | Mn—Zn Ferrite (90) | A (10) | 3.5 | 230° C. | — | — | — | 24 |
| Ref. Example | | | | | | | | |
| 1 | Sr Ferrite (90) | 6-nylon (10) | 2.7 | 165° C. | 2350 | 1900 | 1.35 | — |
| 2 | Sr Ferrite (90) | PPS (10) | 2.6 | 230° C. | 2610 | 2590 | 1.57 | — |

The embodiments of the invention in which an exclusive property or privilege is claimed are defined as follows:

1. A magnetic composite which comprises a magnetic powder and a binder resin of a melt-processable polymer which is capable of forming an anisotropic melt phase, with said magnetic composite having been formed by molding a blend comprising said magnetic powder and said molten polymer which exhibits an anisotropic melt phase.

2. A magnetic composite as claimed in claim 1, which comprises 5 to 99 percent of weight of magnetic powder and 1 to 95 percent by weight of the resin binder which is capable of forming an anisotropic melt phase.

3. A magnetic composite as claimed in claim 1 wherein said magnetic powder is strontium ferrite powder.

4. A magnetic composite as claimed in claim 1 wherein said binder resin of a melt-processable polymer which is capable of forming an anisotropic melt phase includes about 10 mol percent or more of units which include a naphthalene moiety.

5. A magnetic composite as claimed in claim 4 wherein said naphthalene moiety of said binder resin of a melt-processable polymer which is capable of forming an anisotropic melt phase is selected from the group consisting of 6-oxy-2-naphthoyl moiety, 2,6-dioxynaphthalene moiety, and 2,6-dicarboxynaphthalene moiety.

6. A magnetic composite as claimed in claim 1 wherein said binder resin of a melt-processable polymer which is capable of forming an anisotropic melt phase exhibits an inherent viscosity of at least about 2.0 dl./g. when dissolved in a concentration of 0.1 percent by weight in pentafluorophenol at 60° C.

7. A magnetic composite as claimed in claim 1 wherein said binder resin of a melt-processable polymer which is capable of forming an anisotropic melt phase exhibits an inherent viscosity of about 2.0 to 10.0 dl./g. when dissolved in a concentration of 0.1 percent by weight in pentafluorophenol at 60° C.

8. A magnetic composite as claimed in claim 1 wherein said binder resin of a melt-processable polymer which is capable of forming an anisotropic melt phase is a polyester which consists essentially of the recurring moieties I and II which may include substitution of at least some of the hydrogen atoms present upon an aromatic ring wherein:

I is

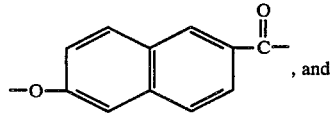, and

II is

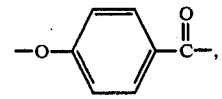, with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises approximately 10 to 90 mol percent of moiety I, and approximately 10 to 90 mol percent of moiety II.

9. A magnetic composite as claimed in claim 8 wherein moiety I is present in a concentration of about 30 mol percent and moiety II is present in a concentration of about 70 mol percent.

10. A magnetic composite as claimed in claim 1 wherein said binder resin of a melt-processable polymer which is capable of forming an anisotropic melt phase is a polyester which consists essentially of recurring moieties I, II, and III where:

I is

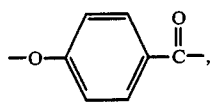

II is

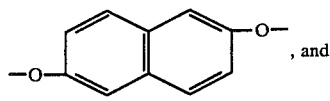, and

III is

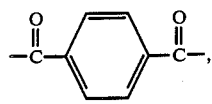

with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises about 30 to 70 mol percent of moiety I.

11. A magnetic composite as claimed in claim 10 wherein moiety I is present in a concentration of about 40 to 60 mol percent, moiety II is present in a concentration of about 20 to 30 mol percent, and moiety III is present in a concentration of about 20 to 30 mol percent.

12. A magnetic composite as claimed in claim 1 wherein said binder resin of a melt-processable polymer which is capable of forming an anisotropic melt phase is a polyester which consists essentially of the recurring moieties I, II, III and IV wherein:

I is

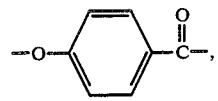

II is

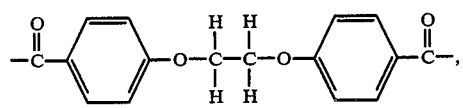

III is

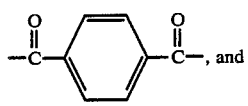, and

IV is

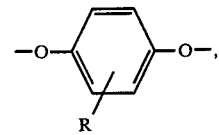

where R is methyl, chloro, bromo, and mixtures thereof, and is substituted for a hydrogen atom present upon the aromatic ring, and wherein the polyester comprises about 20 to 60 mol percent of moiety I, about 5 to 18 mol percent of moiety II, about 5 to 35 mol percent of moiety III, and about 20 to 40 mol percent of moiety IV.

13. A magnetic composite as claimed in claim 12 wherein moiety I is present in a concentration of about 35 to 45 mol percent, moiety II is present in a concentration of about 10 to 15 mol percent, moiety III is present in a concentration of about 15 to 25 mol percent, and moiety IV is present in a concentration of about 25 to 35 mol percent.

14. A magnetic composite as claimed in claim 1 wherein said binder resin of a melt-processable polymer which is capable of forming an anisotropic melt phase is a polyester which consists essentially of moieties I, II, III and IV which may include substitution of at least some of the hydrogen atoms present upon an aromatic ring wherein:

I is

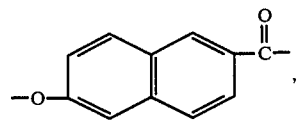

II is

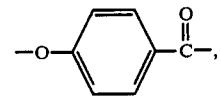

III is a dioxyaryl moiety of the formula —O—Ar—O— where Ar is a divalent radical comprising at least one aromatic ring, and IV is a dicarboxyaryl moiety of the formula

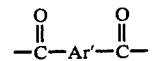

where Ar' is a divalent radical comprising at least one aromatic ring, with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises about 20 to 40 mol percent of moiety I, in excess of 10 mol percent but less than about 50 mol percent of moiety II, in excess of 5 mol percent but less than about 30 mol percent of moiety III, and in excess of 5 mol percent but less than 30 mol percent of moiety IV.

15. A magnetic composite as claimed in claim 14 wherein moiety I is present in a concentration of about 20 to 30 mol percent, moiety II is present in a concentration of about 25 to 40 mol percent, moiety III is present in a concentration of about 15 to 25 mol percent, and moiety IV is present in a concentration of about 15 to 25 mol percent.

16. A magnetic composite as claimed in claim 1 wherein said binder resin of a melt-processable polymer which is capable of forming an anisotropic melt phase is a polyester which consists essentially of recurring moieties I, II, and III which may include substitution of a least some of the hydrogen atoms persent upon an aromatic ring wherein:

I is

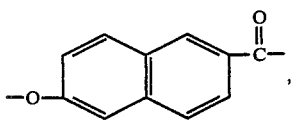

II is a dioxyaryl moiety of the formula —O—Ar—O— where Ar is a divalent radical comprising at least one aromatic ring, and III is a dicarboxyaryl moiety of the formula

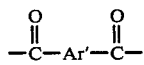

where Ar' is a divalent radical comprising at least one aromatic ring, with said optional substitution if present being selected from the group consisting of an alkyl group of 1 to 4 carbon atoms, an alkoxy group of 1 to 4 carbon atoms, halogen, phenyl, substituted phenyl, and mixtures of the foregoing, and wherein said polyester comprises about 10 to 90 mol percent of moiety I, about 5 to 45 mol percent of moiety II, and about 5 to 45 mole percent of moiety III.

17. A magnetic composite as claimed in claim 16 wherein moiety I is present in a concentration of about 20 to 80 mol percent, moiety II is present in a concentration of about 10 to 40 mol percent, and moiety III is present in a concentration of about 10 to 40 mol percent.

18. A magnetic composite as claimed in claim 1 wherein said binder resin of a melt-processable polymer which is capable of forming an anisotropic melt phase is a poly(ester-amide) which consists essentially of recurring moieties I, II, and III, and optionally IV, wherein:

I is

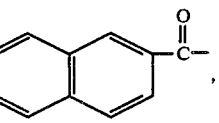

II is

where A is a divalent radical comprising at least one aromatic ring or a divalent transcyclohexane radical, III is —Y—Ar—Z— where Ar is a divalent radical comprising at least one aromatic ring, Y is O, NH, or NR, and Z is NH or NR, where R is an alkyl group having 1 to 6 carbon atoms or an aryl group, and IV is —O—Ar'—O— where Ar' is a divalent radical comprising at least one aromatic ring, with said optional substitution if present being selected from the group consisting of an alkyl group of 1 to 4 carbon atoms, and alkoxy group of 1 to 4 carbon atoms, halogen, phenyl, substituted phenyl, and mixtures of the foregoing, and wherein said poly(ester-amide) comprises about 10 to 90 mol percent of moiety I, about 5 to 45 mol percent of moiety II, about 5 to 45 mol percent of moiety III, and about 0 to 40 mol percent of moiety IV.

19. A magnetic composite as claimed in claim 18 wherein moiety I is present in a concentration of about 70 mol percent, moiety II is

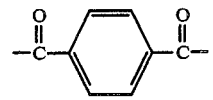

and is present in a concentration of about 15 mol percent, moiety III is

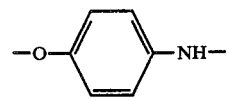

and is present in a concentration of about 15 mol percent, and moiety IV is substantially absent.

* * * * *